Patented June 15, 1943

2,321,624

UNITED STATES PATENT OFFICE 2,321,624

TREATMENT OF ANIMAL TISSUE

John M. Ramsbottom and Levi S. Paddock, Chicago, Ill., assignors to Industrial Patents Corporation, Chicago, Ill., a corporation of Delaware No Drawing. Application March 10, 1941, Serial No. 382,591

14 Claims. (Cl. 99—175)

This invention relates to the treatment of animal intestines and has to do particularly with the manufacture of natural casings, such as sausage casings and the like.

Natural casings, as distinguished from artificial or synthetic casings, are prepared from the intestines of edible animals, such as cattle, swine and sheep. After the intestines are removed from the carcass and cleaned, the resulting product is a tubular membrane appropriate for sausage casings.

Sheep casings command a higher price because of the fact that they generally possess more desirable physical properties than hog casings, Indian sheep casings and beef casings. Hog casings are suited for the manufacture of frankfurters and other sausages similar in size, but because of physical characteristics, they cannot be successfully used in the manufacture of high grade frankfurters and fresh pork sausages because the casing is objectionable, being difficult to masticate. The same is true of Indian sheep casings and beef casings. Moreover, the casing is generally the most difficult part of the sausage to digest, and it is, therefore, highly desirable to have a casing possessing elasticity so that the ratio of casing to sausage meat in the stuffed casing may be reduced to as low a point as possible.

An object of the invention is to provide a method whereby animal intestines may be rendered tender and more adaptable for use as sausage casings.

Another object of the invention is to provide a method whereby such tough casings as hog casings and Indian sheep casings may be tendered to any desired extent and rendered useful in the manufacture of high grade products which require a tender casing.

Another object of the invention is to provide a method of treating natural sausage casings to increase the stretchability and the stuffing capacity of the casings.

A further object of the invention is to provide a method whereby the smoking properties of the casing may be altered.

Other objects and advantages of the invention will become apparent from the description and claims which follow.

The present invention contemplates the treatment of natural casings prepared from animal intestines with an animal proteolytic enzyme or animal proteinase and controlling the action of the proteinase on the casings in such a way that the desired physical properties of the casings are improved efficiently and quickly without excessive hydrolysis or other undesirable effects.

According to the invention, the casings are treated with a suitable animal proteinase under conditions of treatment including strength of the enzymatic solution, temperature, pH value, and time, coupled with steps of operation whereby new and different results from the prior art are obtained.

We are aware that it has been proposed heretofore to treat meat with proteolytic enzymes to obtain tendering. For example, the patent to Paddock et al., No. 2,043,392, discloses the injection of certain enzymes into the vascular system of carcass beef and then holding the treated product under refrigeration. There is no disclosure in that patent of treating natural casings with an enzyme nor the treatment of such casings by the method and under the conditions of the process of the present invention. The patent to Marcano, No. 441,181, discloses the preparation of a meat peptone in which the meat is completely disintegrated into a liquid or soluble pasty form. The Marcano patent has no disclosure of the treatment of natural casings.

Anomal enzymes which hydrolyze proteins that may be used in our invention include the proteinases having optimum activity in an acid medium and proteinases having optimum activity in an alkaline medium. Examples of proteinases having optimum activity in an acid medium which may be used are pepsin and cathepsin. Pepsin occurs, for example, in the fresh stomachs of healthy pigs. While cathepsin or autolytic proteinase may occur naturally in some meat products, it is not present at all or not present in sufficient amount in casings to have any substantial action for applicants' purpose. An example of proteinase having optimum activity in an alkaline medium is trypsin which occurs in the pancreatic juice. Pepsin and trypsin may be isolated as powders which are at least partially soluble in water. A single enzyme or a mixture of two or more enzymes in water or other suitable solvent or a mixture of solvents, each containing a single enzyme, may be used.

Instead of using the enzymes, we may use the parent substances or zymogen and activate the latter with an enzyme activator or kinase. For example, trypsinogen may be activated with enterokinase to produce an active trypsin reagent.

In the use of solutions of the enzymes, there are certain optimum pH values at which the enzymes are most active. The optimum pH value for cathepsin is about 4.5 to 6.5, for pepsin about 1 to 3, and for trypsin about 7 to 9. In the case of pepsin somewhat broader pH ranges may be used, for example, from about 1 to 5.

The solutions of the proteinases may be applied to the casings in any suitable manner, such as washing or soaking in the solution, spraying, dipping or wiping with the solution. The solutions may be applied to either fresh casings or salted casings. In treating the casings after stuffing, the sausages may be dipped, sprayed or wiped with the solution. A solution containing about 0.05 to 0.2 per cent and preferably about 0.1 per cent of any of the proteinase herein described may be used.

The product previously treated by the method described above is subjected to a temperature substantially above refrigeration temperature and within the range of active enzymatic action, and below that at which the enzymic action is destroyed. A suitable temperature range may be about 60 to 125 degrees F. We prefer to use temperatures within the range of about 80 to 115 degrees F. The life of the enzymes is substantially shortened at temperatures of about 130 to 140 degrees F. The casing is maintained in contact with the enzyme previously applied under temperatures within the range of active enzymic action for a sufficient period of time to permit the enzyme to attack the tissue and to effect the desired improvement in physical properties, for example ½ to 3 hours. The temperature is then raised to a point sufficiently high, for example, to a temperature of about 140 degrees F. or higher to substantially terminate the action of the enzymes and avoid excessive action on the casing. In case the product is desired to be cooked, the cooking temperatures may range as high as about 160 to 170 degrees F. and at these temperatures the enzymes are usually inactivated. While the enzymic action may be terminated by the use of sufficiently high temperatures, it is contemplated that other methods of terminating the action of the enzymes may be used such as washing off the enzyme or by the application of a suitable chemical.

The present invention may be practiced by treating the casings before or after stuffing. In the treatment of the casings before stuffing, the fresh or cured casings may be used. The fresh casings after cleaning and washing may be subjected immediately to the treatment as herein specified. It is sometimes advantageous to store the casings for considerable periods of time. In the latter case, the fresh casings are salted and after storing for the desired time, the casings are then washed free from salt. The casings are then treated with the enzyme in the manner described.

One method of practicing the invention is to dip the casings after stuffing in basins or receptacles which may be placed at the end of a conventional stuffing table. One basin is equipped with an overflow and warm water is passed continuously through the basin. Another basin serves as a receptacle for the enzyme. After the sausages are stuffed and linked, the operator dips the sausages in the warm running water basin immersing the sausages two or three times to rinse off particles of meat from the surface of the casings. The sausages are then immersed two or three times in the enzyme solution, care being taken to have the solution reach all portions of the outside surface of the casings.

According to another method of operation, the casings are sprayed with a solution of the enzyme. This method has been found satisfactory for treating stuffed casings. In this way the sausages may be hung on sticks or otherwise supported and then sprayed with the solution. Thereafter the sprayed sausages may be subjected to the subsequent steps of the process herein described.

The product after contacting with the enzyme may be placed in a tempering room for a period of time to obtain the desired enzymic action. A period of about 45 minutes to 1½ hours is usually satisfactory at temperatures of about 60 to 140 degrees F., preferably about 80 to 120 degrees F., and at humidities of about 80 to 85%. The product is then removed to a preheated smoke house wherein temperatures sufficiently high to cure the product, for example, about 120 degrees to 170 degrees F. are maintained. The product is usually kept in the smoke house for about 45 minutes to one or two hours, during which time a gradual increase in temperature, for example, from about 120 to 150 degrees or 160 degrees, may be obtained in about 1½ hours. The air temperature in the smoke house may thereafter be raised to cook the sausages. An air temperature of 165 to 200 degrees F., for example about 170 degrees F. for about 10 to 20 minutes is usually sufficient to effect the necessary cooking. If desired, the product may be removed from the smoke house and separately cooked with water or steam for a short time at a temperature of about 170 degrees F.

As an example of the operation of the invention, frankfurters made with hog casings stuffed with sausage meat are sprayed with an aqueous solution containing about 0.1 per cent pepsin having a pH of about 3. The product is then held in a tempering room at a temperature of about 90 degrees F., and a relative humidity of about 80 to 85 per cent for about one hour. Thereafter, the product is transferred to a smoke house wherein it is subjected to a graduated temperature of about 120 to 160 degrees F. for about 1½ hours. The smoked product is finally cooked in a steam chamber at a maximum temperature of about 170 degrees F. for about 15 minutes.

In some instances it may be desirable to omit the separate tempering or conditioning step and to secure the tempering and smoking in one operation. When the tempering and smoking take place in one operation, the temperatures in the smoke house may be raised through a wide range at least a portion of which is in the field of enzyme activity and the temperature rise through the gradient may be rather slow.

The treatment of the casings according to the present invention produces a product of improved tenderness. For example, ordinary untreated casings are often so tough that it is difficult to break or puncture a stuffed casing by bending, biting, chewing or pulling, whereas the casings treated as described herein may be easily broken by bending and may be readily punctured. The process of the invention also produces casings of substantially uniform tenderness from untreated casings of varying degrees of toughness.

The treatment of the casings results in a product having increased translucency and improved smoking properties. The increased translucency and improved smoking properties of the casing are apparently due to the increased quantity of water absorbed by the casing. On treatment of a casing with a proteolytic animal enzyme, there is usually a noticeable tendency for the casing to swell accompanied by a marked increase in the amount of water absorbed by the casing. The increase in the amount of water in the casing is probably the direct cause of the improved smoking properties. Smoke generally penetrates a wet surface more rapidly and to a greater extent than a dry surface, through which the smoke penetrates very slowly and only to a limited extent. Because of the absorption of greater amounts of water by the treated casing, the casing does not dry out as rapidly as untreated casings, and this alteration in the property of the casing provides a longer effective smoke period due to the more rapid and continued penetration of the smoke.

The treatment of natural casings in accordance with our invention also increases the stretchability of the casings and thereby increases the stuffing capacity of the casings. Upon stuffing casings under identical stuffing conditions, the diameter of the treated casings will be found to be greater than the diameter of untreated casings.

The treatment of natural casings with animal proteinases before stuffing renders the casings more slippery than conventional casings. Casings are placed upon or threaded on a stuffing horn, and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with our invention may be placed on the stuffing horn without first admitting a small amount of water to the casing.

The dye absorption properties of the casings are also improved by the present process in that the casings require a smaller concentration of dye to produce the same intensity of color as compared to untreated casings. This is important when the product is labeled by stamping using a dye for the purpose.

It is to be understood that the time of treatment and the concentration of the enzyme solution are all variable and may be adjusted at will to secure the desired alterations in the physical properties of the casings and are dependent upon the use to which the casings are to be put and the initial properties of the casings.

Obviously many modifications and variations of the invention hereinbefore set forth may be made without departing from the spirit and scope thereof, and therefore only such limitations should be imposed as are indicated in the appended claims.

We claim:

1. The process for the treatment of natural casings which comprises subjecting the casings to the action of an animal proteolytic enzyme in sufficient amount to cause tenderizing of the casings, maintaining the temperature within the range of active enzymic action for sufficient time to cause substantial tenderization without material disintegration of the casings and then arresting the action of said enzyme.

2. The process for the treatment of natural casings to improve the physical properties thereof, including tenderization, which comprises contacting the casings with a solution of an animal proteinase of sufficient strength to cause tenderization of the casings, subjecting the casings to the action of the proteinase for sufficient time to obtain a substantial amount of tenderization without causing material disintegration of the casings while maintaining the temperature within the range of active enzymic action and then subjecting the treated casings to temperatures sufficiently high to arrest the enzymic action of the proteinase.

3. The process for improving the physical properties of natural casings which comprises subjecting the casings to the action of a solution containing about 0.05 to 0.2 per cent of an animal proteinase having optimum activity in an acid medium at temperatures of about 60 to 125 degrees F. for sufficient time to obtain substantial improvement in the physical properties of the casings including tendering, but insufficient to cause material disintegration of said casings, and then arresting the action of the proteinase.

4. The process according to claim 3 in which the proteinase is pepsin.

5. The process according to claim 3 in which the proteinase is cathepsin.

6. The process for improving the physical properties of natural casings which comprises subjecting the casings to the action of a solution containing about 0.05 to 0.2 per cent of an animal proteinase having optimum activity in an alkaline medium at temperatures of about 60 to 125 degrees F. for sufficient time to obtain substantial improvement in the physical properties of the casings including tendering, but insufficient to cause material disintegration of said casings, and then arresting the action of the proteinase.

7. The process according to claim 6 in which the proteinase is trypsin.

8. The process for the treatment of natural casings to improve the physical properties which comprises subjecting the casings to the action of an animal proteinase in sufficient concentration to cause improvement in the physical properties including tenderness, maintaining the temperature within the range of about 80 to 115 degrees F. for sufficient time to cause substantial improvement in the physical properties of the casings including tendering, but insufficient to cause material disintegration of the casings, and then subjecting the treated casings to temperatures sufficiently high to arrest the action of the proteinase.

9. The process according to claim 8 in which the time of treatment with the proteinase is about 45 minutes to 2 hours.

10. The process for the treatment of stuffed natural casings which comprises subjecting the casings to the action of an animal proteinase in sufficient amount and for a sufficient time to cause substantial improvement in the physical properties of the casings including the tenderness without causing material disintegration of the casings while maintaining temperatures within the range of active enzymic action of said proteinase, and then subjecting the product to smoking and cooking at temperatures sufficiently high to substantially arrest the enzymic activity of the proteinase.

11. The process according to claim 10 in which the temperature of smoking and cooking is within the range of about 120 to 170 degrees F.

12. The process for the treatment of sausages stuffed in natural casings, which comprises treating the sausages with an animal proteinase at a temperature of between about 60 degrees F. and the temperature at which the proteinase is substantially inactivated for a period of time sufficient to cause material improvement in the physical properties of the casings including tenderness, but insufficient to cause material disintegration of the casings, smoking the treated sausages while hot and finally subjecting the resulting product for a short time to temperatures sufficiently high to arrest the action of the proteinase.

13. The process according to claim 12 in which the temperature of proteinase treatment is at least in part within the range of about 80 to 115 degrees F.

14. The process according to claim 12 in which the smoking temperature is about 120 to 160 degrees F.

JOHN M. RAMSBOTTOM.
LEVI S. PADDOCK.